United States Patent [19]
Baran

[11] Patent Number: 5,341,415
[45] Date of Patent: Aug. 23, 1994

[54] METHOD AND APPARATUS FOR SHARING OF COMMON IN-HOUSE WIRING TO PERMIT MULTIPLE TELEPHONE CARRIERS TO SERVE THE SAME CUSTOMER

[76] Inventor: Paul Baran, 83 James Ave., Atherton, Calif. 94027

[21] Appl. No.: 949,424

[22] Filed: Sep. 22, 1992

[51] Int. Cl.$^5$ ............................................ H04M 3/42
[52] U.S. Cl. .................................... 379/201; 379/120; 379/140; 379/156
[58] Field of Search ..................... 379/201, 64, 65, 66, 379/108, 109, 114, 120, 128, 140, 156

[56] References Cited

U.S. PATENT DOCUMENTS

| | | | |
|---|---|---|---|
| 2,957,047 | 10/1990 | Wennemer. | |
| 4,191,860 | 3/1980 | Weber. | |
| 4,245,245 | 1/1981 | Matsumoro et al. | 358/122 |
| 4,356,484 | 10/1982 | Eckhardt | 340/825.03 |
| 4,404,514 | 9/1983 | Reichert, Jr. | 455/5.1 |
| 4,410,765 | 10/1983 | Hestad et al. | 379/220 |
| 4,430,731 | 2/1984 | Gimple et al. | 370/30 |
| 4,521,881 | 6/1985 | Stapleford et al. | 370/72 |
| 4,530,008 | 7/1985 | McVoy | 358/86 |
| 4,533,948 | 8/1985 | McNamara et al. | 358/122 |
| 4,534,024 | 8/1985 | Maxemchuck et al. | 370/85 |
| 4,577,312 | 3/1986 | Nash | 370/112 |
| 4,633,462 | 12/1986 | Stifle et al. | 358/86 |
| 4,689,619 | 8/1987 | O'Brien, Jr. | 370/95.2 |
| 4,698,841 | 10/1987 | Haselton et al. | 370/60 |
| 4,717,970 | 1/1988 | Long | 358/86 |
| 4,751,510 | 6/1988 | de Saint Michel et al. | 370/84 |
| 4,763,317 | 8/1988 | Lehman et al. | 370/60 |
| 4,763,322 | 8/1988 | Eizenhofer | 370/95 |
| 4,763,323 | 8/1988 | Nelson et al. | 370/85.6 |
| 4,764,920 | 8/1988 | Furuya | 370/94.1 |
| 4,768,188 | 8/1988 | Barnhart et al. | 370/80 |
| 4,771,425 | 9/1988 | Baran et al. | 370/85 |
| 4,797,879 | 1/1989 | Habbab et al. | 370/3 |
| 4,819,228 | 4/1989 | Baran et al. | 370/85 |
| 4,829,297 | 5/1989 | Ilg et al. | 340/825.08 |
| 4,837,800 | 6/1989 | Freeburg et al. | 379/59 |
| 4,860,379 | 8/1989 | Schoeneberger et al. | 455/5.1 |
| 4,866,763 | 9/1989 | Cooper et al. | 379/221 |
| 4,887,290 | 12/1989 | Dop et al. | 379/33 |
| 4,901,340 | 2/1990 | Parker et al. | 379/60 |
| 4,903,261 | 2/1990 | Baran et al. | 370/110.1 |
| 4,920,533 | 4/1990 | Dufresne et al. | 370/85.2 |
| 4,933,935 | 6/1990 | Adams | 370/85.7 |
| 4,949,395 | 8/1990 | Rydbeck | 455/33.1 |
| 4,956,839 | 9/1990 | Torii et al. | 370/60 |
| 4,959,862 | 9/1990 | Davidov et al. | 380/10 |
| 4,961,188 | 10/1990 | Lau | 370/94.2 |

(List continued on next page.)

OTHER PUBLICATIONS

Jerrold Communications, *PCN Interface Using CATV Feeder, In–Home PCN Integration, PCN Interface At The Home, In–Home Interface, In–Home PCN Interface, Integrated Home Block Diagram.*

(List continued on next page.)

*Primary Examiner*—James L. Dwyer
*Assistant Examiner*—Ahmad F. Matar
*Attorney, Agent, or Firm*—Allston L. Jones

[57] ABSTRACT

A system to allow two or more telephone carriers to automatically connect to existing in-house telephone wiring wherein the choice of carrier is made by the calling party. Service is provided on a default basis by a primary carrier, however, the user can select and cause an alternative carrier to be connected to the in-house wiring permitting the use of standard telephone equipment with different carriers at the option of the calling party. In this system the switching arrangement is such that only one carrier is connected to the in-house wiring at any one time. Additionally, there is provision to detect incoming calls from carriers other than the default primary carrier and to switch to that carrier in response to the incoming call. Further, this system permits the packetization of outgoing information and the receipt of packetized incoming information on the secondary carrier with standard telephone equipment that is connected to the in-house wiring.

8 Claims, 2 Drawing Sheets

U.S. PATENT DOCUMENTS

| | | | |
|---|---|---|---|
| 4,970,717 | 11/1990 | Haas | 370/60 |
| 4,972,505 | 11/1990 | Isberg | 455/3.1 |
| 4,980,886 | 12/1990 | Bernstein | 370/80 |
| 4,980,907 | 12/1990 | Raith et al. | 379/63 |
| 4,982,440 | 1/1991 | Dufresne et al. | 445/4.1 |
| 4,991,172 | 2/1991 | Cidon et al. | 370/94.1 |
| 4,991,206 | 2/1991 | Blais | 380/7 |
| 4,998,247 | 3/1991 | Irvine-Halliday et al. | 370/94.1 |
| 5,001,707 | 3/1991 | Kositpaiboon et al. | 370/94.1 |
| 5,007,043 | 4/1991 | Van Den Dool et al. | 370/60 |
| 5,010,329 | 4/1991 | Nagakura | 370/95.2 |
| 5,012,469 | 4/1991 | Sardana | 370/95.3 |
| 5,016,245 | 5/1991 | Lobjinski et al. | 370/60 |
| 5,029,163 | 7/1991 | Chao et al. | 370/95.1 |
| 5,048,081 | 9/1991 | Gavaras et al. | 379/221 |
| 5,067,123 | 11/1991 | Hyodo et al. | 370/58.1 |
| 5,111,454 | 5/1992 | Hung et al. | 370/95.3 |
| 5,115,431 | 5/1992 | Williams et al. | 370/94.1 |
| 5,124,980 | 7/1992 | Maki | 370/77 |
| 5,130,793 | 7/1992 | Bordry et al. | 455/5.1 |
| 5,132,680 | 7/1992 | Tezuka et al. | 340/825.08 |
| 5,138,649 | 8/1992 | Krisbergh et al. | 379/56 |
| 5,161,154 | 11/1992 | Diaz et al. | 370/95.1 |
| 5,241,534 | 8/1993 | Omuro et al. | 370/16 |

OTHER PUBLICATIONS

Leland L. Johnson and David P. Reed, *Residential Broadband Services by Telephone Companies?, Technology, Economics, and Public Policy*, RAND, R-39-06-MF/RL, Jun. 1990, pp. v–ix.

James Chiddix and Ronald Wolfe, Communications Engineering and Design, *Fiber optic implementation, A case study*, Sep. 1989, pp. 8, 14, 16, 19, 21–22.

METHOD AND APPARATUS FOR SHARING OF COMMON IN-HOUSE WIRING TO PERMIT MULTIPLE TELEPHONE CARRIERS TO SERVE THE SAME CUSTOMER

CROSS REFERENCE

The present application is related to an application by the same inventor entitled, "DIGITAL TELEPHONE, CABLE TV SYSTEM AND LOCAL EXCHANGE BYPASS NETWORK" filed on Sep. 17, 1991, and given Ser. No. 07/761,281 and assigned to the same assignee.

FIELD OF THE INVENTION

The present invention relates to equipment that allows two or more competing alternative telephone carriers to serve the same customer using the customer's existing in-house telephone wiring without interference from one telephone carrier's system to the other's.

BACKGROUND OF THE INVENTION

In the US, the long distance (inter-exchange) telephone carriers were deregulated in the past when the technology necessary to support multiple common carriers became available. Along the same line there is a growing public policy interest in deregulation of the local exchange carriers that provide the local telephone connection.

In the past an alternative local carrier would require new overlapping right-of-way approvals. This meant that the alternative carrier would require new pole space and trenching the streets for the new telephone company's wires. This was deemed not to be in the public interest and the local telephone system was thus regarded as a natural monopoly.

It would be desirable to add competition to the local telephone service market without the duplication that has heretofore been necessary to do so. It would also be desirable to offer telephone services from multiple carriers utilizing the existing wiring in homes and offices. The present invention provides such a system.

SUMMARY OF THE INVENTION

In accordance with the embodiments of the present invention there is provided an arrangement to automatically allow two or more telephone carriers to supply telephone service to a facility using existing wiring without modification and otherwise normally serving only a single telephone carrier wherein the choice of carrier is by the calling party. Service is normally provided by a primary carrier that serves on a default basis. A telephone user dialing a prefix code selects the carrier to be used. Switching arrangements insure that one and only one carrier is connected to the user's telephone wiring at any one time. Incoming calls from multiple independent carriers can be answered using the existing in-house wired telephones without modification.

BRIEF DESCRIPTION OF THE DRAWINGS

The operation of the present invention can be better understood by reference to the drawings.

DESCRIPTION OF THE PREFERRED EMBODIMENTS

Figure 1:
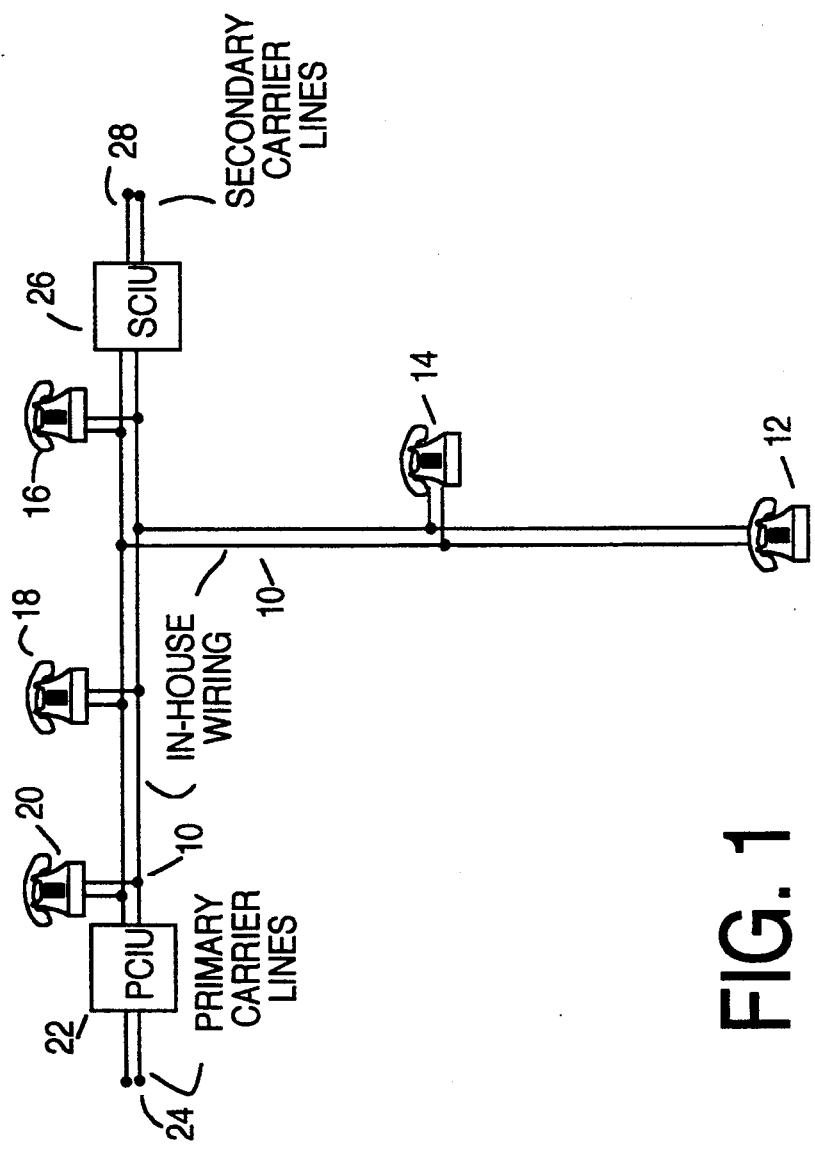
FIG. 1 is a block diagram of the overall connections between the carriers and the inter-structure wiring.

The present invention is made possible by alternative telephone technologies that are becoming available which do not require new wiring. One of these advances is short range cordless telephones that can be interfaced with a cable TV system serving as a bi-directional transmission path. Such technology allows the creation of an alternative telephone carrier that bypasses the current local exchange system, without the past necessity for new wires to the home. To make that possible the present invention provides the necessary hardware to make multiple use of existing telephone wiring within a structure to allow two or more different alternative telephone systems to coexist without the need to rewire each structure since telephone equipment and wiring within the house are considered the property of the home owner.

In present telephone systems, a telephone central office supplies operating power for the individual telephone instruments, as well as, monitoring current flow to determine when a telephone is off-hook, providing a dial tone and a high voltage ringing signal to inform the user of an incoming call. An alternative carrier will also have to provide such capabilities as well.

The present invention allows the customer a choice of competing telephone systems while using the same telephone and telecommunication instruments connected to the same telephone wiring within the structure. In providing that choice to the consumer the present invention also prevents undesirable interactions from taking place between the two or more telephone systems.

This is accomplished through the use of individually designed modules to interface the internal wiring of the structure and the connected telephone sets to each of the selected telephone systems. A first module is placed at the first, or primary carrier's, demarcation block, and a second module is placed at each of the secondary carriers' demarcation blocks.

The "demarcation block" is the boundary between a telephone company's wiring and the customer's owned "in-house" on premises wiring and customer provided equipment (CPE). One of the objectives of the present invention is to avoid having to add new internal or external telephone wiring, and to allow all of the telephones being served by the multiple carriers to use the conventional two-wire telephone cable already in place in the customer's structures.

Telephone service is currently supplied by a single carrier, and for purposes of discussion in this specification that service will be referred to as being supplied by the "primary telephone carrier". At present that is the only external line connected to the internal in-house telephone wiring of each subscriber. The primary telephone carrier is initially assumed to be of the twisted-copper-wire-to-the-central--office type. The new carrier, or carriers, which the present invention will support are each assumed to use a cable TV system as a bi-directional transmission path and for purposes of discussion here is called the "secondary carrier". More than one secondary carrier could be supported, but for clarity of discussion, only one primary and one Secondary Carrier is described here in detail.

Referring now to FIG. 1 there is shown in-house telephone wiring 10 having telephone sets 12-20 connected thereto. Additionally there is a Primary Carrier Interface Unit (PCIU) 22 and a secondary carrier Interface Unit (SCIU) 26 each connected to in-house wiring 10. PCIU 22 is mounted at the demarcation line between the primary carrier lines 24 to provide an interface between those lines and the customer's in-house wiring 10. Similarly SCIU 26 is mounted at the point of demarcation line between the secondary carrier lines 28 and the customer's in-house wiring 10.

Access to the secondary carrier will generally be by cable or radio means. In one embodiment of the present invention, the secondary carrier demarcation point occurs at a modular telephone jack at a TV set top converter unit connected to the cable TV drop cable, which serves as part of the secondary carrier's transmission path. The Secondary Carrier Interface Unit (SCIU) 26 could be contained within the cable TV set top unit.

All interactions between the PCIU 22 and the SCIU 26 take place over the same two wire twisted pair cable that forms in-house telephone wiring 10.

Figure 2:
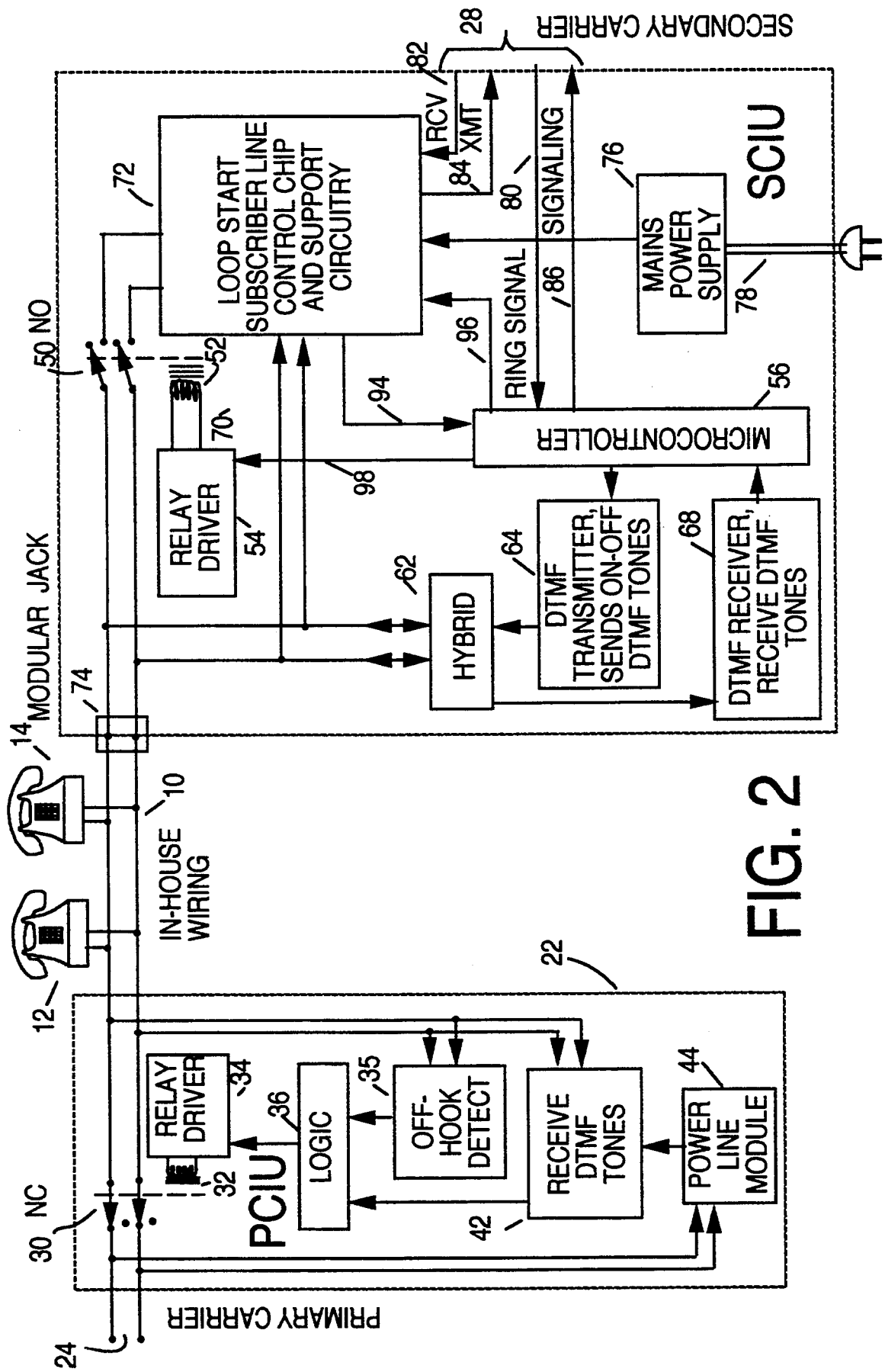
FIG. 2 is a block diagram showing details of the implementation of the Primary Carrier Interface Unit (PCIU) and the Secondary Carrier Interface Unit (SCIU) modules of the present invention.

FIG. 2 illustrates the internal components of both PCIU 22 and SCIU 26. Since it is necessary to prevent interference between carriers it is necessary that one, and only one, carrier be connected to in-house wiring 10 at any one time. To accomplish this, each of PCIU and SCIU include relay switches 30 and 50, respectively. In FIG. 2, PCIU switches 30 are shown as normally closed and SCIU switches 50 are shown as normally open. As will be described below, when the subscriber selects to be connected to the secondary carrier, switches 30 are remotely opened before switches 50 are remotely closed. The break-before-make configuration is necessary to insure that both carriers are not connected to the in-house wiring at the same time thus preventing the shorting out of the voltage level provided by the primary carrier.

The preselected subscriber entered signals for selecting the use of the secondary carrier, for example, might be #8 entered via the keypad of one of telephone sets 12-20. If there are additional secondary carriers available to the subscriber they might be selected by entry of #7, or perhaps #81, or other combination not normally encountered as a present valid dialing combination. Code #9 might be used to connect the primary carrier to the in-house wiring 10. However, as will be discussed below the primary carrier will normally be connected to in-house wiring 10 whenever the system is in the standby mode or when the subscriber is using the primary carrier, the subscriber will not have to enter that code to connect in-house wiring 10 to the primary carrier.

Any of the codes that are discussed above that are transmitted via in-house wiring 10 will be received by PCIU 22 and to one or more SCIUs 26 that are connected to in-house wiring 10. Thus, as described above, PCIU 22 will open relay switches 30 when it receives a code for any of the secondary carriers.

The primary carrier is generally the normal Public Switched Telephone System (PSTN). As such, the primary carrier provides a dc operating voltage plus high voltage ringing signals. Thus, in FIG. 2 PCIU 22 is shown with a power line module 44 that is connected to primary carrier telephone lines 24 to generate the necessary voltage levels to power the other components of PCIU 22.

The purpose of PCIU 22 is to control relay switches 30 so that they are open only when the subscriber is connected to a secondary carrier.

Within PCIU 22 is a relay coil 32 for controlling the opening and closing of switch contacts 30 under the control of relay driver 34. Additionally there is a DTMF (dual tone multiple frequency) detector 42 (e.g. Silicon Systems DTMF Receiver SS157T202) for detecting on-off signals sent in DTMF form by the SCIU 26 via in-house wiring 10, as discussed below. Since most telephones in use in the U.S. today use touch-tone signaling, a DTMF unit is shown in use here. However, it should be understood that the system of the present invention could also be implemented using the earlier pulse technology or by placing a pulse detector in parallel with the DTMF detector to interface with the older equipment as well.

The signals received by DTMF detector 42 are decoded and presented to a logic device 36 as standard logic type signals. A coded pattern signal received from DTMF detector 42 processed by logic device 36 operates power relay driver 34 to cause switch contacts 30 to change position. This coded pattern causes the disconnection of the primary carrier from in-house wiring 10. The end of a telephone call via the secondary carrier is detected by off-hook detector 35, which causes the reconnection of the primary carrier to in-house wiring 10. As one experienced in the telephone art can appreciate, signaling means other than DTMF could be used in this application with similar results.

In FIG. 2, SCIU 26 is shown connected to in-house wiring 10 by means of a modular jack 74, which is internally connected directly to one side of switches 50. As discussed above, SCIU 26 could be part of a set-top cable TV unit that is connected to the incoming cable from the cable service. That cable has the capacity to handle bi-directional communications using one part of the cable's spectrum for upstream telephone signals and the remainder of the spectrum for downstream transmission for both TV signals and telephone signals on suitable carriers (not shown). Thus, SCIU 26 interfaces to the secondary carrier 28 via a TV set-top unit (not shown) to the TV cable system. A second cable, which is a standard telephone type cable, is connected between modular jack 74 on the TV set-top unit and a telephone jack in an interior wall of the structure in the same way as one would connect an extension telephone today.

As the secondary carrier transmission will commonly use radio, TV cable and fiber optics in lieu of a twisted pair of wires from a central office, thus these media of transmission do not allow for the transmission of dc signals and high voltage ringing signals which are required to operate existing telephone devices, such as telephone sets 12-20. To generate those voltages and signals that are needed by the PSTN telephone instruments 12-20, as well as the power to operate SCIU 26, SCIU 26 includes a mains driven power supply 76 that is connected to the subscriber's electrical utility power line.

Connected on the other side of switches 50 from modular jack 74 is an integrated circuit chip 72 to provide the functionality needed to support the PSTN telephone sets 12-20. This chip could be implemented by a Texas Instruments Subscriber Line Control Circuits chip TCM4204A (a complete description of the features and operation of that chip is available in *Texas Instruments Telecommunications Circuit Data Book, Linear Products,* 1991, pp. 4-107 to 4-131). The SLCC chip 72 provides the necessary services to support telephone off-hook supervision, electronic hybrid function, signal conditioning, over-voltage protection, battery feed, and ringing control.

With SLCC chip 72 the secondary carrier can be provided either as a "two-wire" or a "four-wire" connection in which the sending and receiving paths share the same wires. In the most likely embodiments the "four wire" configuration will be used (as shown in FIG. 2) with the received and transmitted signals being carried by lines 82 and 84, respectively, between the secondary carrier lines 28 and SLCC chip 72. In SLCC chip 72 those signals are converted bi-directionally by an internal electronic hybrid to interface with the two wire in-house wiring 10 for use with existing telephone sets 12-20. Ringing initiation can be sent/received on either the receive/transmit pair 82-84, or on separate ringing signal and signaling lines 80 and 86 via microcontroller 56 and lines 96 and 94, respectively, which are connected between microcontroller 56 and SLCC chip 72. On these lines a coded pattern corresponding to the desired ringing signal is transmitted. Thus SLCC chip 72 is the conduit between the secondary carrier and the in-house wiring 10 for in-coming and out-going telephone calls.

The secondary carrier is connected to the in-house wiring 10 only under two conditions. One, when an in-coming call is being received from the secondary carrier and the in-house wiring 10 is not already busy with another call from the primary carrier or any other carrier, and two, when the subscriber elects to make an out-going call on the secondary carrier.

To prevent SCIU 26 from connecting the secondary carrier to in-house wiring 10 when the primary carrier is connected to in-house wiring 10, SCIU 26 checks for an off-hook condition. When one of a telephone sets 12-20 has it's receiver off-hook, the in-house wiring 10 line voltage drops from the normal 48 volts when the receiver is on-hook to only a few volts. SLCC chip 72 is connected to the extension of the in-house wiring 10 between modular jack 74 and switches 50 to allow a supervisory connection within SLCC chip 72 to monitor the voltage level on in-house wiring 10 and to sense the low voltage off-hook condition. SLCC chip 72 in response, generates an off-hook signal which is delivered to microcontroller 56 via line 94 to prevent microcontroller 56 from sending a relay activation signal to relay driver 54 on line 98 to change the state of switches 50 as long as the off-hook condition exists unless the subscriber has also selected the secondary carrier.

Similarly, when in-house wiring 10 is connected to the secondary carrier an off-hook voltage level appears on in-house wiring 10. This off-hook voltage level is sensed in the same way as in the condition of the previous paragraph by SLCC chip 72 and microcontroller 56 is blocked from sending a signal to relay driver 54 to change the state of switches 50. As soon as the off-hook condition on in-house wiring 10 disappears when the subscriber hangs up, regardless of whether the subscriber was using the primary carrier or the secondary carrier, microcontroller 56 sends a signal to relay driver 54 to open switches 50. Thus, it is possible that a signal to open switches 50 could be sent to relay driver 54 even if switches 50 are already open. Microcontroller 56 can be implemented by a device such as a Motorola 68HC04, or equivalent.

Also connected to the extension of in-house wiring 10 within SCIU 26 between modular jack 74 and switches 50 is a bi-directional hybrid 62. In communication with hybrid 62 are two other modules, a DTMF receiver 68 to monitor subscriber entered codes via one of telephone sets 12-20 and hybrid 62, and a DTMF generator 64 for generating tones to be placed on in-house wiring 10 via hybrid 62 and modular jack 74 to be sent to PCIU 22.

DTMF receiver 68 monitors the touch-tone signals on in-house wiring 10 in the same way that DTMF receiver 42 in PCIU 22 does and then converts those signals to logic signals that microcontroller 56 can use. For example, when the touch-tone signal on in-house wiring 10 entered by the subscriber is the code to select the primary carrier (this could happen however, as stated above, connection to the primary carrier is the normal condition and it should not be necessary for the subscriber to make that selection), or a different secondary carrier, microcontroller 56 will send a signal to relay driver 54 to open switches 50.

Similarly, if the subscriber enters the code from the touch-tone keypad of one of the telephone sets 12-20 (or generates it by another device such as a modem) microcontroller 56 is programmed to recognize the code that corresponds to the secondary carrier to which it is connected. Once that recognition is registered, microcontroller 56 awaits an off-hook signal on line 94 from SLCC chip 72 before instructing relay driver 54 to close switches 50. An off-hook signal is detected by SLCC chip 72 here after PCIU 22 causes switches 30 to open. More specifically, before switches 30 open, the voltage level on in-house wiring 10 by virtue of its connection to the primary carrier is approximately 48 volts, and after switches 30 open, in-house wiring 10 is not connected to any voltage source and is in essence floating with no current flowing. The absence of a current flow results in SLCC chip 72 reading the voltage level on in-house wiring 10 as zero, thus assuming that there is an off-hook condition.

For purposes of discussion in this paragraph assume the normal state for the system of FIG. 2 is with telephone sets 12-20 inactive and switches 30 closed and switches 50 open. If there is an incoming call on the primary carrier the call is received as it is in today's telephone systems and no changes occur in PCIU 22 or SCIU 26. However, if there is an incoming telephone call on the secondary carrier it is first necessary to change the state of switches 30 and 50. In this situation a signal from the secondary carrier is received by microcontroller 56 on line 80. At this point in time in-house wiring 10 is still at 48 volts and the signal on line 94 is not an off-hook signal thus relay driver 54 is not yet triggered to close switches 50. Microcontroller 56 first triggers DTMF generator 64 to generate the tone that the subscriber would enter to select the secondary carrier to which SCIU 26 is connected. That tone is then applied to in-house wiring 10 via hybrid 62 and modular jack 74 so that it can be detected by DTMF receiver 42 of PCIU 22 so that it will open switches 50 as if the subscriber had entered the code for the secondary carrier. Switches 30 are then opened and switches 50 are closed by the same mechanism that was described above when the subscriber entered the appropriate code for the secondary carrier.

Further, with the advent of some new generation communication systems where the signals are sent and received in packetized form (e.g. Cellular telephones have a "send" button that is pushed after the entire number has been entered—packetizing thus reduces transmission time) SCIU 26 easily lends itself to this technology. With the inclusion of microcontroller 56, packetized signals received on line 80 can be depacketized by microcontroller 56 for use on in-house wiring 10 by the conventional telephone sets 12-20, or signals to be transmitted on the secondary carrier can be packetized by microcontroller 56 prior to being placed on out-going line 86.

It will also be apparent to one skilled in the art how to modify the specific system described above to achieve the same functional result given the teachings of this disclosure. Thus, the present invention is not limited by the above description, but rather only by the scope of the appended claims.

What is claimed is:

1. A competitive access on premises telephone connection system to allow a telephone user to selectively connect a single in-house telephone wiring circuit, to a primary carrier and to a secondary carrier, said primary and said secondary carriers having separate and independent physical paths, connected to said single in-house wiring circuit are said telephone user's telephone sets and telecommunications equipment, said system comprising:

a first remotely controlled switching unit having a first switch connected between said single in-house telephone wiring circuit and said primary carrier with said first switch being normally closed, said first switch disposed to selectively disconnect and interconnect said single in-house telephone wiring circuit to and from said primary carrier on the premises of said telephone user;

a second remotely controlled switching unit having a second switch connected between said single in-house telephone wiring circuit and said secondary carrier with said second switch being normally open, said second switch disposed to selectively interconnect and disconnect said single in-house telephone wiring circuit from and to said secondary carrier on the premises of said telephone user;

an actuation controller coupled to said first switching unit and said second switching unit to individually control the activation of said first switching unit and said second switching unit, and thus the corresponding said first and second switches, to connect or disconnect said single in-house telephone wiring circuit to either said primary carrier or said secondary carrier in response to a selection of carrier made by said telephone user; and a pair of interlocks, each coupled to a different one of said first and second switching units, with each of said pair of interlocks coupled to and under the control of said actuation controller to prevent closure of an open one of said first and second switches before the opening of a closed one of said first and second switches to prevent the interconnection of said primary carrier and secondary carrier one to the other through said single in-house telephone wiring circuit.

2. A system as in claim 1 further includes a decoder coupled to said single in-house telephone wiring circuit and said actuation controller, said decoder, in response to a preselected one of a set of electronically transmitted codes that correspond to signals that said telephone user initiates via one of said telephone sets and other telecommunications equipment connected to said single in-house telephone wiring circuit with one code to designate said primary carrier and another code to designate said secondary carrier, to signal said actuation controller to actuate the corresponding one of said first and second switching units to connect the telephone user optionally selected primary carrier or secondary carrier to said single in-house wiring circuit through the corresponding one of said first and second switches.

3. A system as in claim 1:
wherein said second switching unit further includes a third switch that is normally open; and
wherein said system further includes a power supply subsystem to generate ringing signals and telephone operating voltages when said second switch is closed thus connecting said single in-house telephone wiring circuit to said secondary carrier;
wherein said third switch of said second switching unit is connected between said single in-house telephone wiring circuit and said power supply subsystem.

4. A system as in claim 1 further includes:
an off-hook detector connected to said single in-house telephone wiring circuit and said actuation controller to generate an off-hook signal when one of said telephone sets or other telecommunications equipment connected to said single in-house telephone wiring circuit is off-hook;
wherein said actuation controller, after receiving off-hook signal and a telephone user entered code preselected to select said secondary carrier, activates said first and second remotely controlled switching units to disconnect said primary carrier from, and to connect said secondary carrier to said single in-house telephone wiring circuit.

5. A system as in claim 1 further includes:
a telephone connection jack disposed to interconnect with said single in-house telephone wiring circuit; and
a standard telephone cable running between said telephone connection jack and said second switch of said second remotely controlled switching unit in an interior wall within a structure of said telephone user.

6. A system as in claim 4 wherein said actuation controller includes a dual tone multifrequency signal detector connected to said single in-house telephone wiring circuit to detect a dual tone multifrequency signal generated by one of said telephone sets and other telecommunications equipment when said telephone user causes said telephone sets and other telecommunications equipment to generate a preselected code signal to select said secondary carrier to be connected to said single in-house telephone wiring circuit.

7. A system as in claim 1 further including a packetizer connected between said second switch of said second remotely controlled switching unit and said secondary carrier to convert signals generated by said telephone sets and other communications equipment connected to said single in-house telephone wiring circuit in response to telephone user actions to enter telephone numbers and other signals caused to be generated by said telephone user via said telephone sets and other communications equipment connected to said single in-house telephone wiring circuit to packetize said signals for transmission to said secondary carrier when said secondary carrier is connected to said single in-house telephone wiring circuit.

8. A system as claim 1 wherein:
said primary carrier is conveyed over a physical local loop telephone line that provides voltage levels and ringing signals; and
said secondary carrier is conveyed over a bi-directional TV cable system.

* * * * *